(12) United States Patent
Sankar et al.

(10) Patent No.: US 8,279,789 B2
(45) Date of Patent: Oct. 2, 2012

(54) INTELLIGENT SETTING OF HYSTERESIS ACTIVATION TIMER TO ENTER HYSTERESIS SOONER AND SAVE BATTERY

(75) Inventors: Malladi Uma Sankar, Hi Tec (IN); Gonella Mallikarjuna Rao, Hi Tec (IN)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 12/481,266

(22) Filed: Jun. 9, 2009

(65) Prior Publication Data
US 2010/0002613 A1 Jan. 7, 2010

Related U.S. Application Data (60) Provisional application No. 61/060,213, filed on Jun. 10, 2008.

(51) Int. Cl.
G08C 17/00 (2006.01)
(52) U.S. Cl. .......................................... 370/311
(58) Field of Classification Search .................... 370/311
See application file for complete search history.

(56) References Cited

U.S. PATENT DOCUMENTS

| 7,194,282 | B2 * | 3/2007 | Jarvisalo et al. | 455/522 |
| 2004/0156348 | A1 * | 8/2004 | Cheng et al. | 370/338 |
| 2006/0182054 | A1 * | 8/2006 | Islam et al. | 370/328 |
| 2006/0209741 | A1 * | 9/2006 | Willey | 370/328 |
| 2008/0069071 | A1 * | 3/2008 | Tang | 370/342 |
| 2011/0201129 | A1 * | 8/2011 | Ma et al. | 455/272 |

FOREIGN PATENT DOCUMENTS

| EP | 1701568 A1 | 9/2006 |
| RU | 2289217 C2 | 12/2006 |
| WO | WO2004064292 | 7/2004 |

OTHER PUBLICATIONS

International Search Report and Written Opinion—PCT/US2009/046919, International Search Authority—European Patent Office—Nov. 18, 2009.

\* cited by examiner

*Primary Examiner* — Chi Pham
*Assistant Examiner* — Farah Faroul
(74) *Attorney, Agent, or Firm* — D. Scott Juneau (57) ABSTRACT

Systems and methodologies are described that intelligently set a hysteresis activation timer in a wireless communication environment. In accordance with various aspects set forth herein, systems and/or methods are provided that continuously monitor a data session to determine whether or not an application is exchanging data with a counterpart device, acquire indication from a hysteresis activation timer of whether or not the hysteresis activation timer is active, determine an appropriate new hysteresis activation timer value with which to set the hysteresis activation timer, and thereafter sets the hysteresis activation timer with the new hysteresis activation timer value.

21 Claims, 9 Drawing Sheets

INTELLIGENT SETTING OF HYSTERESIS ACTIVATION TIMER TO ENTER HYSTERESIS SOONER AND SAVE BATTERY

CLAIM OF PRIORITY UNDER 35 U.S.C. §119

The present application for patent claims priority to Provisional Application No. 61/060,213, entitled "INTELLIGENT SETTING OF HYSTERESIS ACTIVATION TIMER TO ENTER HYSTERESIS SOONER AND SAVE BATTERY", filed Jun. 10, 2008, which is assigned to the assignee hereof and hereby expressly incorporated by reference herein.

BACKGROUND

I. Field

The following description relates generally to wireless communications, and more particularly is directed to methods and systems relating to actions performed by access terminals or mobile devices when such devices are dormant and the access terminal or mobile device determines that it is unlikely that further data will be interchanged with a cooperating base station.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Wireless communication systems can typically be divided into multiple packet zones wherein as a mobile device traverses amongst the various zones it can be required to reconnect its packet data service whenever changes in System ID (SID), Network ID (NID), or Packet Zone ID (PZID) parameters associated with a wireless network are detected. Generally, and compliance with the 3GPP2 standard "Data Service Options for Spread Spectrum Systems: Service Options 33 and 66" (e.g., 3GPP2 C.S0017-012-A, Version 2.0) that defines the requirements necessary to support high-speed packet data transmission capability on CDMA2000® spread spectrum systems, the reconnect process is necessary to maintain PPP (point-to-point protocol) connectivity in case the wireless network needs to move the so-called "R-P" interface (also known as A10 and A11) between the Radio Access Network (RAN) and the Packet Data Servicing Node (PDSN) associated with the packet data service or in some cases needs to assign a new IP address to the mobile device. Nevertheless, where packet zone changes are rapid and/or continuous, an inordinate amount of processing resources can unnecessarily be expended in facilitating such precipitous and/or constant reconnection, leading to a commensurate depletion of battery life on the mobile device. In order to avoid the foregoing issues, a mobile device can be placed in a state of hysteresis allowing the mobile device to reduce the number of connections when the device is transitioning between two or more packet zones and when an associated base station has not required the mobile device to store more than one visited packet zone. Typically a hysteresis state can be entered into through use of a Hysteresis Activation Timer (HAT) that monitors the amount of time remaining before the mobile device is placed in hysteresis. Accordingly, by setting the hysteresis activation timer (HAT) to a smaller value can place the mobile device into a state of hysteresis sooner thereby both avoiding reconnections when the packet zones change quickly as well as saving some over the air messaging.

However, a conflict can arise when a mobile device or access terminal has multiple applications running simultaneously and exchanging data concurrently with a base station. The conflict occurs when the multiple applications attempt to control (e.g., set or reset) a Hysteresis Activation Timer (HAT) value when they have no data to interchange, which can result in undesired or incorrect value settings of the Hysteresis Activation Timer (HAT).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The claimed subject matter relates to actions that can be performed by a mobile device when it is dormant and determines that it is unlikely that further data will be exchanged with a base station. One such action is for the mobile device to set a Hysteresis Activation Timer (HAT) to a value between 0 to 30 seconds based on knowledge about whether or not there is data to be exchanged with the base station, whereupon on expiration of the Hysteresis Activation Timer (HAT) the mobile device transitions to a hysteresis state and a Hysteresis Timer will commence. Placing a device in a hysteresis state allows the device to reduce the number of connections when the device is moving between two or more packet zones and the base station has not required the device to store more than one visited packet zone. Moreover, the hysteresis state can commence as soon as the Hysteresis Activation Timer (HAT) timer expires. Setting the Hysteresis Activation Timer (HAT) to a smaller value will typically place the device into a hysteresis state sooner thereby avoiding re-registrations when packet zones change quickly. Further, placing a device in a state of hysteresis can also save some over the air messaging as well as conserve battery life of the device. Accordingly, when a device knows that it has no further data to intercommunicate, the objective of the claimed subject matter is to set an associated Hysteresis Activation Timer (HAT) to the lowest permissible value, which can imply that applications that are exchanging data need to be imbued with the capability of being able to discern when the ongoing data interchange will be over, and thereafter to set the Hysteresis Activation Timer (HAT) value an appropriate value so as to push the device into a state of hysteresis sooner. In accordance with one aspect, the claimed subject matter can allow all applications executing on a mobile device to set the Hysteresis Activation Timer (HAT) value appropriately when the realize they have no data to exchange. Nevertheless, this simple solution can be impractical as many applications can attempt to set the Hysteresis Activation Timer (HAT) value simultaneously which can result in undesirable contention. Accordingly, in accordance with a further aspect, the claimed subject matter enables applications to ascertain the Hysteresis Activation Timer (HAT) status and thereafter allow them to make an intelligent decision as to what to set the Hysteresis Activation Timer (HAT) value. This can be achieved by allowing applications to know if the Hysteresis Activation Timer (HAT) is running or not; allowing applications to know how much time is left for the Hysteresis Activation Timer (HAT) to expire (e.g., when the Hysteresis Activation Timer (HAT) is running). Based on the above information, applications can take an intelligent decision on whether or not to set or modify the Hysteresis Activation Timer (HAT) value to a new value. Once applications determine the appropriate Hysteresis Activation Timer (HAT) value and set the Hysteresis Activation Timer (HAT) to the new value, then the mobile device can update the Hysteresis Activation Timer (HAT) accordingly to be effective from the next time that the Hysteresis Activation Timer (HAT) is stopped and/or started again, if it is already running.

The claimed subject matter in accordance with various aspects set forth herein discloses a method that intelligently sets a hysteresis activation timer in a wireless communication environment wherein the method includes monitoring a data session to determine whether or not an application is exchanging data, acquiring an indication from the hysteresis activation timer regarding whether or not the hysteresis activation timer is active, determining a new hysteresis activation timer value based at least in part on the indication, and thereafter updating the hysteresis activation timer with the new hysteresis activation timer value.

In accordance with a further aspect, the claimed subject matter discloses an apparatus that can include a memory that retains instructions related to monitoring a data session to determine whether an application is exchanging data, acquiring an indication from a hysteresis activation timer of whether or not the hysteresis activation timer is active, based at least in part on the indication, determining a new hysteresis activation timer value, and subsequently updating the hysteresis activation timer with the new hysteresis activation timer value. Additionally, the apparatus can also include a processor, coupled to the memory, which can be configured to execute the instructions retained in the memory.

Further, the claimed subject matter, in accordance with additional aspects, discloses a wireless communications apparatus that intelligently sets a hysteresis activation timer in a wireless communication environment, wherein the apparatus includes means for determining whether or not data interchange between a means for transmitting and means for receiving is taking place, means for checking a current status of the hysteresis activation timer associated with the means for receiving, means for ascertaining a new hysteresis activation timer value, and means for updating the hysteresis activation timer with the new hysteresis activation timer value.

Moreover, the claimed subject matter in accordance with yet a further aspect discloses a computer program product that comprises a computer-readable medium. The computer-readable medium can comprise code for monitoring a data session to determine whether an application is exchanging data, code for acquiring an indication from an hysteresis activation timer of whether the hysteresis activation timer is active, code for determining a new hysteresis activation timer value, and code for setting the hysteresis activation timer with the new hysteresis activation timer value.

Furthermore, in accordance with a further aspect, the matter as claimed discloses a wireless communications apparatus, comprising a processor configured to continuously monitor a data session to determine whether or not an application is exchanging data, obtain an indication from an hysteresis activation timer of whether or not the hysteresis activation timer is active, ascertain a new hysteresis activation timer value, and reset the hysteresis activation timer with the new hysteresis activation timer value.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB) or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Figure 1:
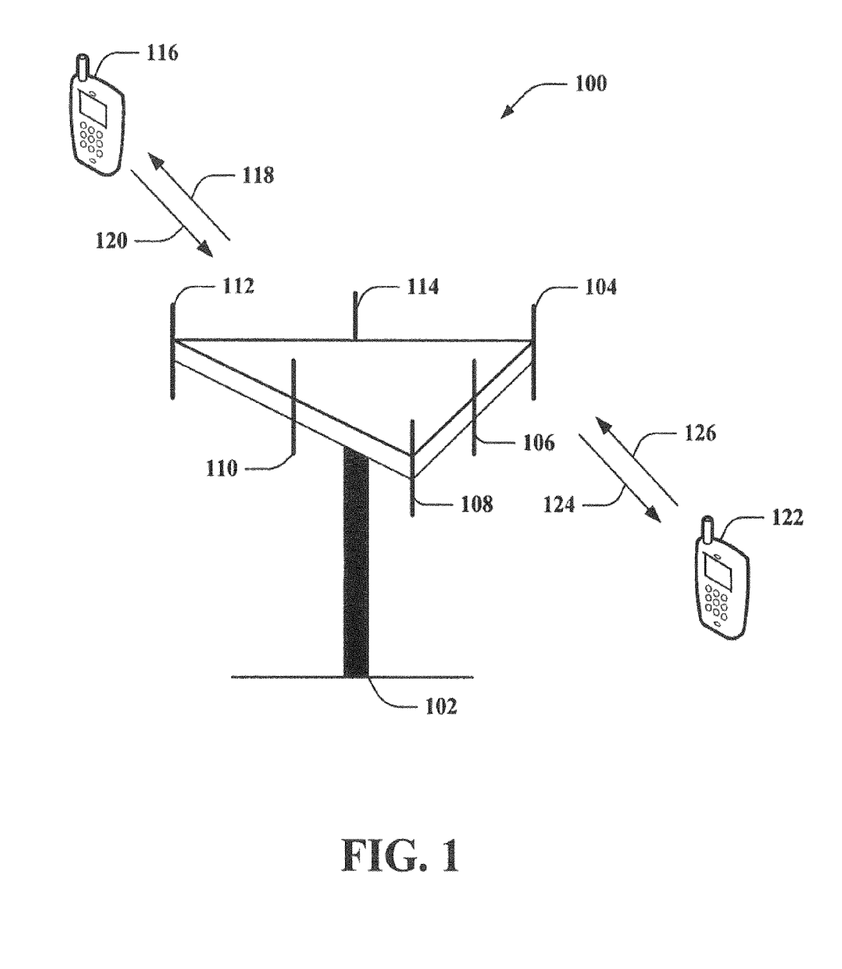
FIG. 1 is an illustration of a wireless communication system in accordance with various aspects set forth herein.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
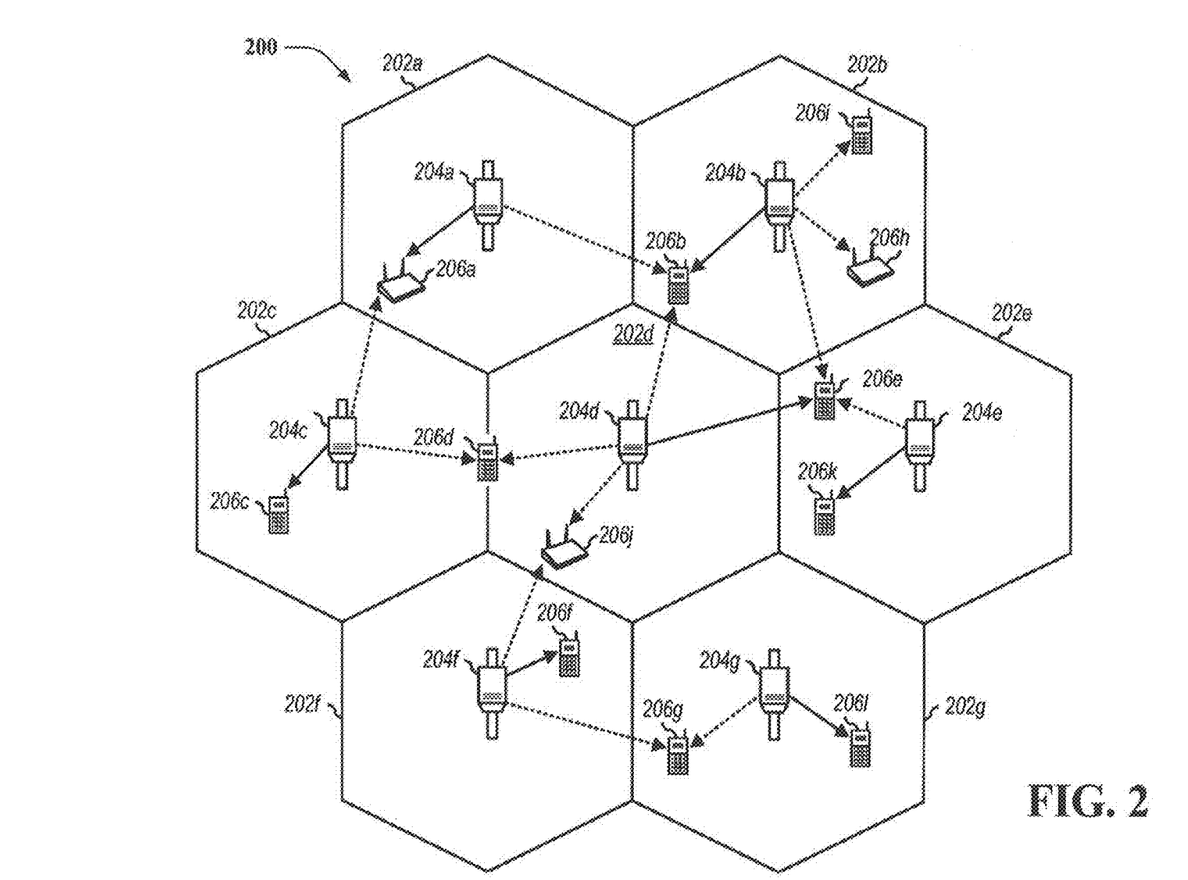
FIG. 2 provides illustration of a further wireless communication system configured to support a number of users, in which various disclosed embodiments and aspects can be implemented.

FIG. 2 provides illustration of a further wireless communication system 200 configured to support a number of users, in which various disclosed embodiments and aspects may be implemented. As shown in FIG. 2, by way of example, system 200 provides communication for multiple cells 202, such as, for example, macro cells 202a-202g, with each cell being serviced by a corresponding access point (AP) 204 (such as APs 204a-204g). Each cell may be further divided into one or more sectors. Various access terminals (ATs) 206, including ATs 206a-206k, also known interchangeably as user equipment (UE) or mobile stations, are dispersed throughout the system. Each AT 206 may communicate with one or more APs 204 on a forward link (FL) and/or a reverse link (RL) at a given moment, depending upon whether the AT is active and whether it is in soft handoff, for example. The wireless communication system 200 may provide service over a large geographic region, for example, macro cells 202a-202g may cover a few blocks in a neighborhood.

At the outset and prior to providing an extensive exposition of the claimed subject matter, it should be noted without limitation or loss of generality, that while the claimed subject matter might in certain instances and/or aspects be explicated in terms of mobile devices, access terminals, access point base stations, femtocells, or Home Node B (HNB) stations, the claimed subject matter can nonetheless can find expansive application and/or utility within a wider wireless communication infrastructure. For instance, the claimed subject matter can be utilized within base stations and/or access terminals with equal and indistinguishable effect and/or applicability.

The concept that underpins the claimed subject matter relates to actions performed by access terminals or mobile devices when they are dormant and the access terminal or mobile device determines that it is unlikely that further data will be interchanged with a cooperating base station. In particular and in accordance with an aspect of the claimed matter, when an access terminal or mobile device determines that it is unlikely that further data will be exchanged with a cooperating base station within a time specified by a Hysteresis Activation Timer (HAT), the access terminal or mobile device can set the Hysteresis Activation Timer (HAT) to zero. Additionally and/or alternatively and in accordance with a further aspect of the matter as claimed, when the Hysteresis Activation Timer (HAT) is active and the mobile device or access terminal ascertains that further data will be intercommunicated with its corresponding base station before expiration of the Hysteresis Activation Timer (HAT), the mobile device or access terminal can cancel the Hysteresis Activation Timer (HAT).

In accordance with further aspects of the claimed subject matter, when the access terminal or mobile device becomes (or is about to become) dormant and it ascertains that further data interchange between itself and/or its associated base station is unlikely, the mobile device or access terminal can set the Hysteresis Activation Timer (HAT) to a value between zero and thirty, for example. On expiration of the time the access terminal or mobile device can go into a Hysteresis State at which point a Hysteresis Timer can start. The Hysteresis State allows mobile devices or access terminals to reduce the number of connections when they are moving between two or more packet zones and the associated base station has not required the mobile stations or access terminals to store more than one visited packet zone; the Hysteresis State can commence as soon as the Hysteresis Activation Timer (HAT) expires. Accordingly, setting the Hysteresis Activation Timer (HAT) to a smaller value can put the access terminal or mobile device into a Hysteresis State earlier, thus avoiding re-registration when packet zones change quickly and curtailing some unnecessary over the air messaging. By placing the access terminal or mobile device into a Hysteresis State earlier, mobile device or access terminal battery life can be prolonged significantly.

Accordingly and in view of the foregoing therefore, when the access terminal or mobile device knows or has ascertained that there is no further data to exchange, the objective of the claimed subject matter is to set the Hysteresis Activation Timer (HAT) to a lowest permissible value, which means that applications exchanging data between the mobile device or access terminal and a corresponding base station need the cognition necessary to determine when the data interchange will cease and thereafter the acumen required to set the Hysteresis Activation Timer (HAT) to a value low enough to push the mobile device or access terminal into a Hysteresis State sooner.

Figure 3:
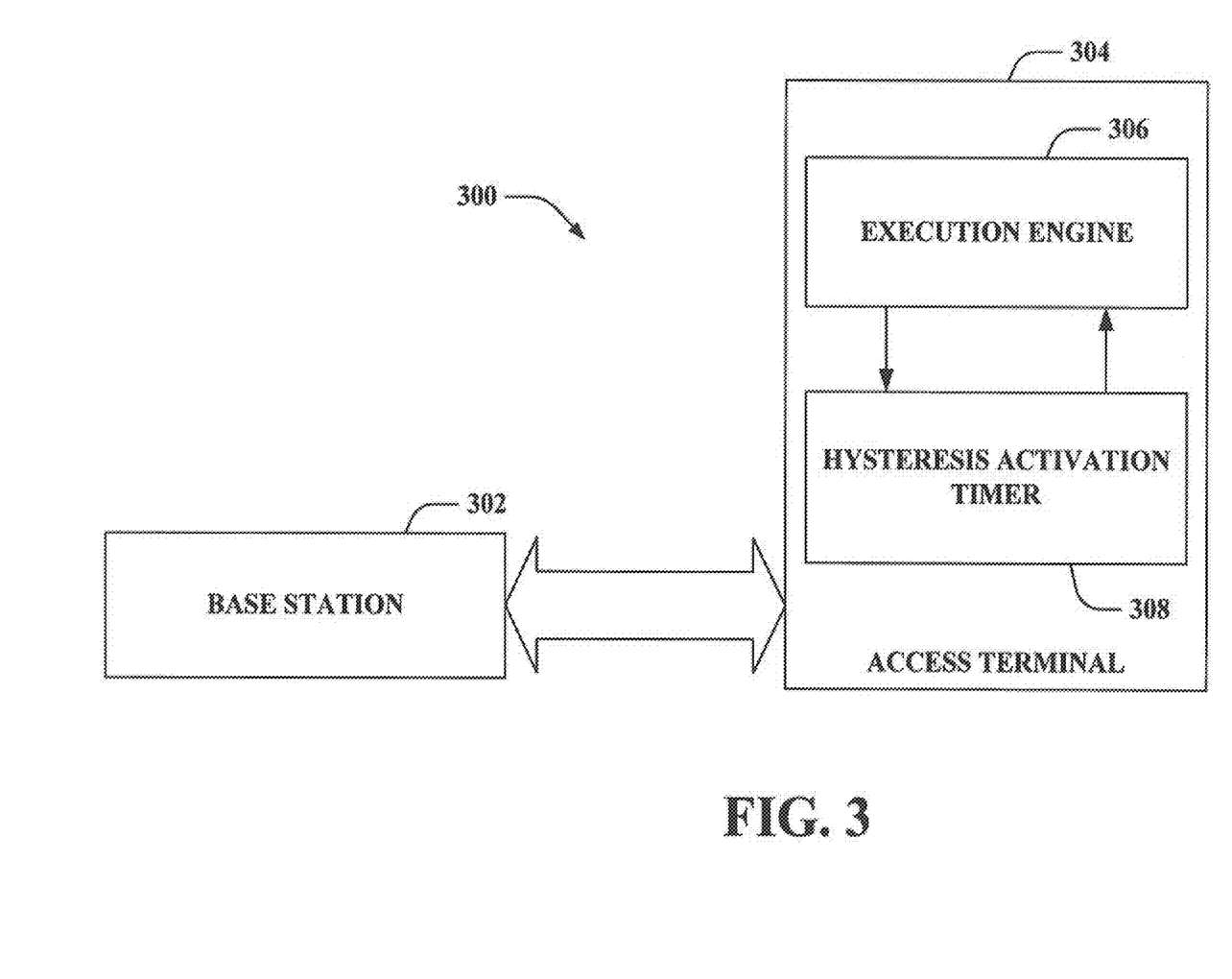
FIG. 3 is an illustration of an example system that that intelligently sets a hysteresis activation timer so that hysteresis can be entered sooner in order to conserve the battery life of an associated mobile device or access terminal.

Turning now to FIG. 3 that depicts a system 300 that intelligently sets a hysteresis activation timer so that hysteresis can be entered sooner in order to conserve the battery life of an associated mobile device or access terminal. As illustrated, system 300 can include base station 302 that can be in continuous and/or operative or sporadic and/or intermittent communication with access terminal or mobile device 304 (hereinafter referred to as "access terminal 304"). Since the basic functionality of base station and access terminal 304, respectively, have been expounded upon above in connection with FIG. 1 and FIG. 2, a further detailed description of such features has been omitted to avoid unnecessary repetition and for the sake of brevity and conciseness. Nonetheless as illustrated, access terminal 304 can include execution engine 306 that can provide the functionalities and facilities necessary for applications executing on access terminal 304 to determine whether or not there is a continuing need to interchange data with associated base station 302, where there currently is an on-going data interchange taking place between the applications and base station 302, execution engine 306 can ascertain when the current data intercommunication will cease or be over, and thereafter can set hysteresis activation timer 308 to a value low enough to place access terminal 304 into a state of hysteresis sooner.

In particular, execution engine 306 can operate in the following manner in order to provide the functionalities and/or facilities to applications executing or running on access terminal 304. Execution engine 306 can monitor data sessions being carried by the various executing applications to determine whether or not the data session is active and whether or not each of the executing applications is exchanging data, for example, with base station 302. Further, execution engine 306 can ascertain the quantum of data that each of the executing applications has yet to exchange and based at least in part on the amount of data yet to be exchanged, execution engine 306 can communicate with hysteresis activation timer 308 to obtain the current status of hysteresis activation timer 308. Where execution engine 306 ascertains that hysteresis activation timer 308 is running, execution engine 306 can further query hysteresis activation timer 306 to obtain the value of remaining time before which the time currently set on the hysteresis activation timer 306 will expire. Execution engine 306 can thereafter determine, based at least in part on factors such as the quantum of data that each of the executing applications has yet to exchange and the remaining amount of time before which the hysteresis activation timer 308 will expire, an appropriate value to which to set hysteresis activation timer 308. For instance, execution engine 306 can determine, based at least in part on the foregoing factors, to take no action, to lengthen the period of time before which the hysteresis activation timer 308, or to shorten the period of time before which the hysteresis activation timer 308 will expire and place access terminal 304 into a state of hysteresis. Execution engine 306, once an appropriate course of action has been ascertained, can update or set the hysteresis activation timer 308 with an apposite value.

With regard to hysteresis activation timer 308, this component can be implemented as a hardware timer and/or a software timer (e.g., a timer implemented as a combination of hardware and/or software in execution). Accordingly, hysteresis activation timer 308 can be a generic, nonspecific hardware timer configured to provide the functionalities and/or functionalities of a hysteresis activation timer, and as such can be a up count timer (e.g., marks the effluxion of time by counting up from a value) or a down count timer (e.g., marks the passage of time by counting down from a value). Further, hysteresis activation timer 308 can be a timer specifically manufactured or personalized to provide the facilities and/or functionalities of a hysteresis activation timer.

It should be noted that execution engine 306 and/or hysteresis activation timer 308 can be implemented entirely in hardware and/or a combination of hardware and/or software in execution. Moreover, execution engine and/or hysteresis activation timer 308 can be incorporated within and/or associated with other compatible components. Additionally, execution engine 306 and/or hysteresis activation timer 308 can be, but are not limited to, any type of machine that includes a processor and/or is capable of effective communication with a wired and/or wired communication network.

Figure 4:
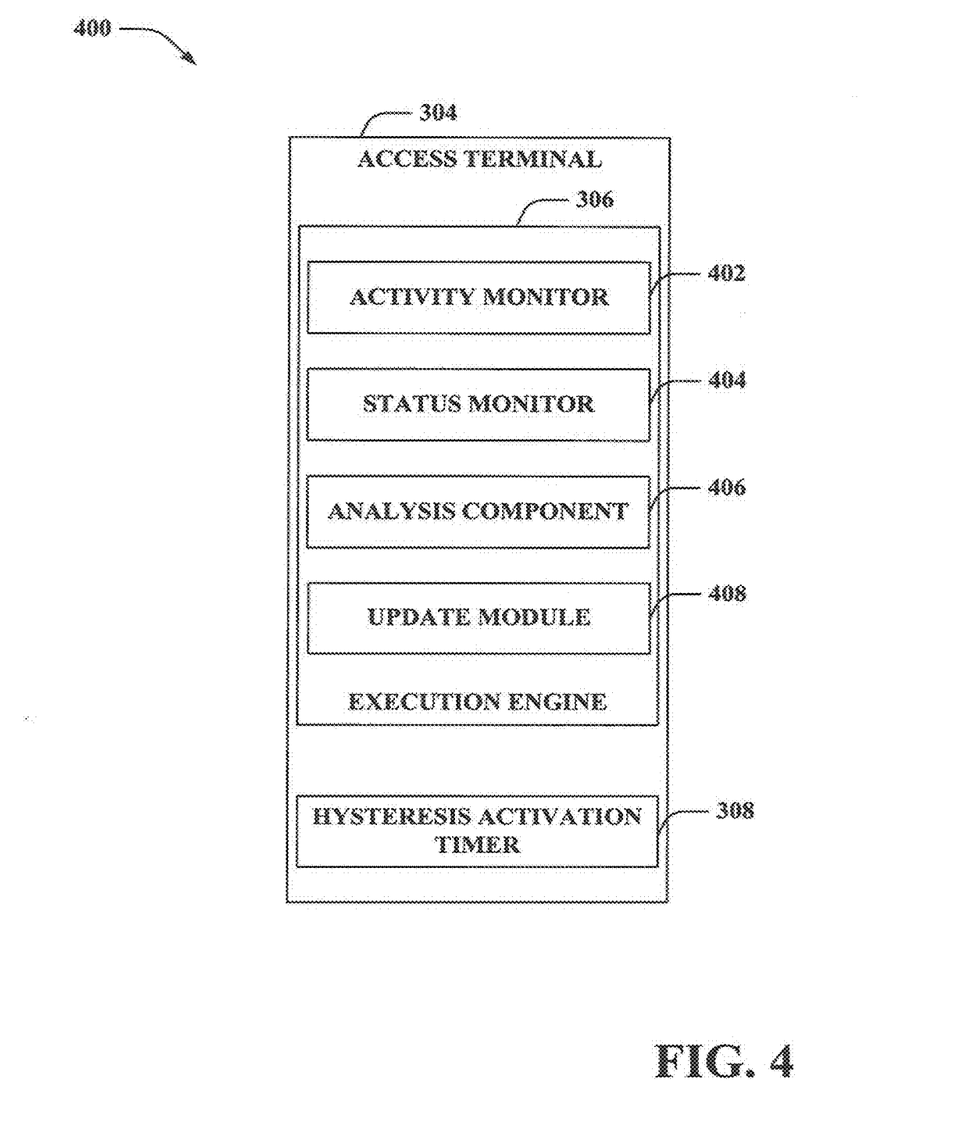
FIG. 4 is an illustration of an example system that intelligently sets a hysteresis activation timer so that a hysteresis state can be entered sooner in order to conserve the battery life of an associated mobile device or access terminal.

FIG. 4 provides a more detailed illustration 400 of access terminal 304, and in particular, a more detailed depiction of execution engine 306 that intelligently sets a hysteresis activation timer 308 so that a hysteresis state can be entered sooner in order to conserve the battery life of an associated mobile device or access terminal. As illustrated execution engine 306 can include activity monitor 402 that can continuously and/or sporadically monitor data session activity and/or determine whether or not applications executing on access terminal 304 and utilizing the facilities and/or functionalities provided by execution engine 306 are interchanging data with counterpart devices (e.g., base station 302, other access terminals, etc.). Where activity monitor 402 determines that there is continuous and/or intermittent data session activity and/or ascertains that one or more applications executing on access terminal 304 and employing the functionalities and/or facilities provided by execution engine 306 are exchanging data, activity monitor 402 can continue monitoring such activity until the one or more applications cease to have further data to interchange with a corresponding device (e.g., base station 302, other access terminals, . . . ) or until such time that the one or more applications provide indication to activity monitor 402 that the quantum of data needed to be interchanged with its counterpart device, though not complete, is nevertheless approaching an end.

Further as illustrated, execution engine 306 can also include status monitor 404 that can periodically and/or continuously check the current status of hysteresis activation timer 308. Based at least in part on the results returned by status monitor 404, analysis component 406 can be utilized to ascertain a value with which to set hysteresis activation timer 308 where status monitor 404 reports that hysteresis activation timer 308 is not running, and further analysis component 406 can also be employed to provide a new value with which to reset the hysteresis activation timer 308 when status monitor 404 notes that the hysteresis activation timer 308 is running. Thus, based at least in part on input received or elicited from status monitor 404, analysis component 406, in one instance, can query hysteresis activation timer 308 to obtain the value of the remaining time set before hysteresis activation timer 308 is to expire and can thereafter utilize the value of the remaining time set to determine a revised time value with which to reset hysteresis activation timer 308. Alternatively and in accordance with a further aspect, analysis component 406, based at least in part on a received or solicited notification from status monitor 404 that hysteresis activation timer 308 had hitherto been inactive, can ascertain a new value with which to set hysteresis activation timer 308.

Additionally, execution engine 306 can include update module 408 that, based at least in part on inputs received from analysis component 406, can decide whether or not to set, reset, or update the value that hysteresis activation timer 308 can utilize as a timer. Accordingly, based on one set of inputs received from analysis component 406 a decision can be made by update module 408 not to update or reset the hysteresis activation timer 308 value—leaving the current value, without alteration, as the hysteresis activation timer 308 value. Further, based on an alternate set of inputs obtained from analysis component 406, a decision can be made by update module 408, that the current value is inadequate (e.g., the period defined by the value either is too long or too short) for the purposes of the applications executing on access terminal 304 to complete data interchange, and as such update module 408 can set, reset, or update the value utilized by hysteresis activation timer 308 to accommodate the running applications accordingly.

Figure 5:
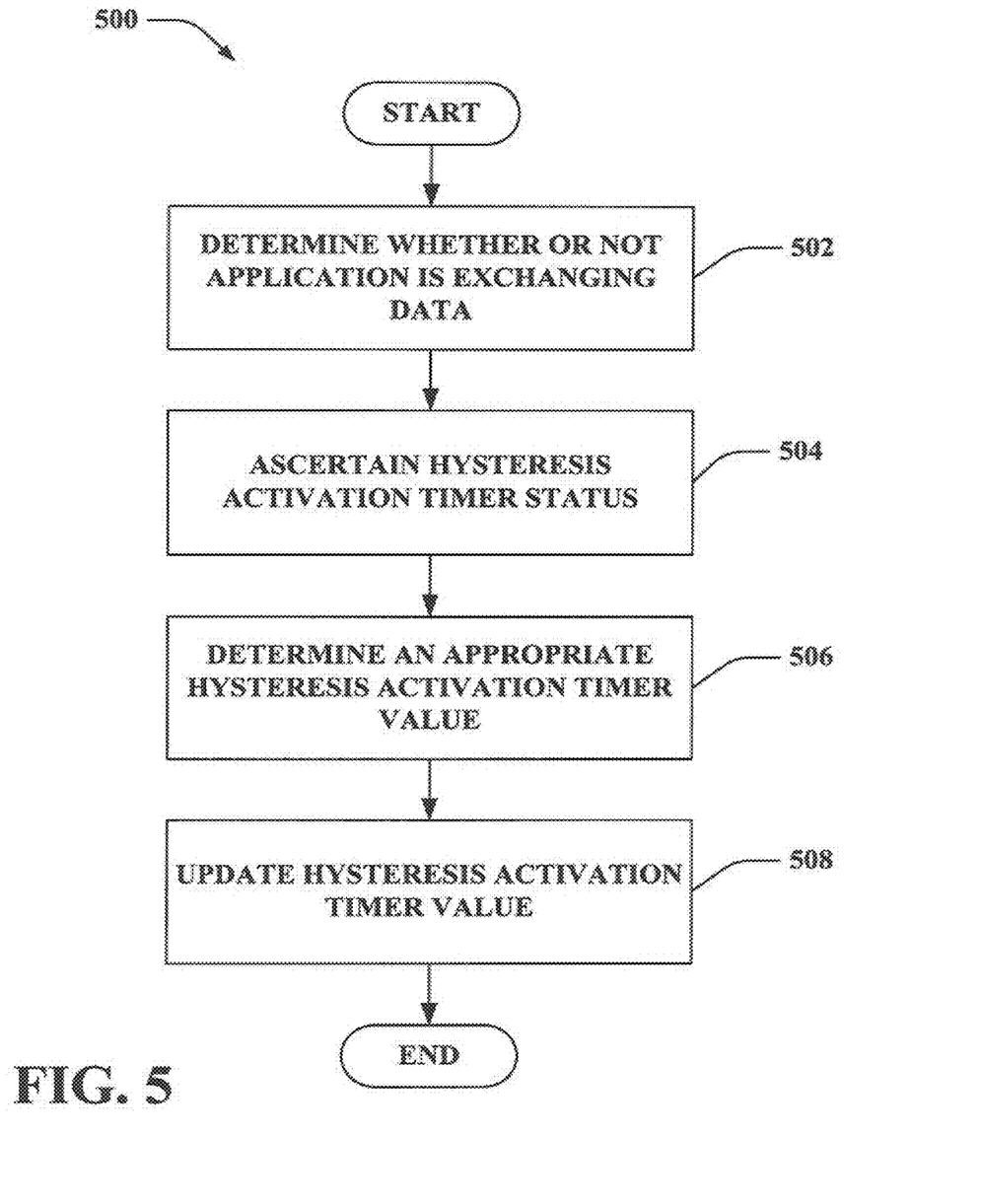
FIG. 5 is an illustration of an example methodology that intelligently sets a hysteresis activation timer so that hysteresis can be entered sooner in order to conserve the battery life of an associated mobile device or access terminal.
Figure 6:
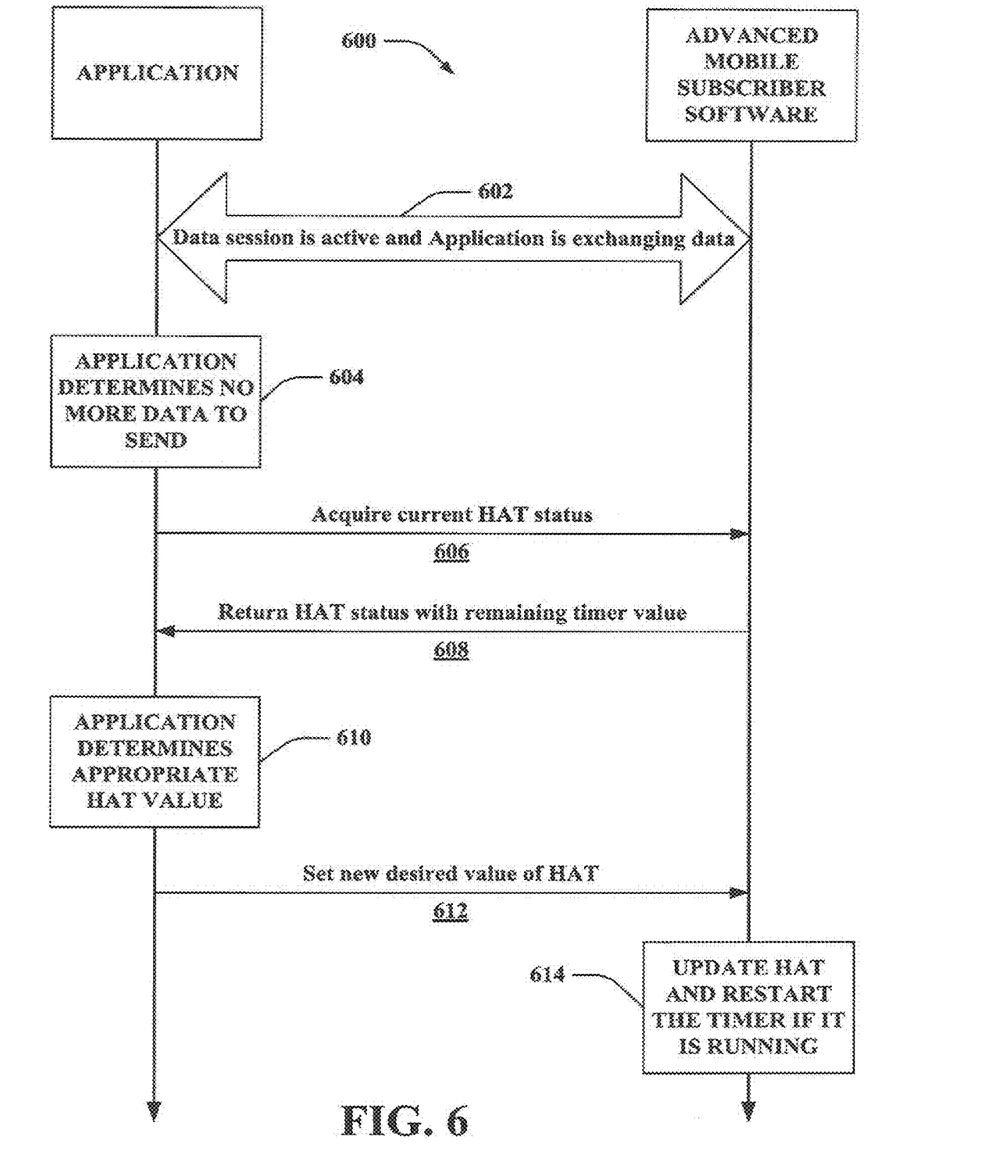
FIG. 6 is an illustration of an example call flow that intelligently sets a hysteresis activation timer so that hysteresis can be entered sooner in order to conserve the battery life of an associated mobile device or access terminal.

Referring to FIGS. 5-6, methodologies relating to intelligently setting a hysteresis activation timer so that hysteresis can be entered sooner in order to conserve the battery life of an associated mobile device or access terminal are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that intelligently sets a hysteresis activation timer so that hysteresis can be entered sooner in order to conserve the battery life of an associated mobile device or access terminal. Method 500 can commence at 502 where a determination can be made as to whether or not one or more applications are exchanging data and/or a data session is currently active. Where it is ascertained that at 502 that there is an active data session and/or that one or more applications are exchanging data, method 500 can continue monitoring whether or not the applications are exchanging data and/or an active data session continues to exist. On the other hand where it is ascertained at 502 that the data session has become inactive and/or that the one or more applications have no further data to exchange (or the one or more applications indicate that the amount of data to be exchanged is small and/or the data session is soon to be terminated) with a counterpart device (e.g., base station 302), method 500 can proceed to 504 where the status of the hysteresis activation timer can be ascertained at which point method 500 can proceed to 506. Where it is determined at 504 that the hysteresis activation timer is not running, then at 506 a new and appropriate hysteresis activation timer value can be ascertained and the hysteresis activation timer can be updated with this value. Alternatively, where it is determined at 504 that the hysteresis activation timer is running, then at 506 a query can be made of the hysteresis activation timer to get the remaining time before the hysteresis activation timer expires and based at least in part on the remaining time value obtained from the hysteresis activation timer a revised value determined, at which point method 500 can proceed to act 508. At 508 prior to updating the hysteresis activation timer with the revised value, method 500 can ascertain whether or not the revised determined value is preferable to the value previously obtained from the hysteresis activation timer of the current remaining time before the hysteresis activation timer expires. Where it is determined that the revised value is preferable to the value previously obtained, the hysteresis activation timer can be updated with this value at 508. Alternatively, where it is determined that the value previously obtained from hysteresis activation timer is preferable to the newly determined revised value, no action need be taken and the hysteresis activation timer can utilize the value it is currently operating under to effectuate its purposes (e.g., transitioning the mobile device to a hysteresis state sooner).

FIG. 6 illustrates a call flow 600 that can take place between an application running on a mobile device (e.g., access terminal 304) and advanced mobile subscriber software (AMSS), for instance. As depicted call flow 600 commences at 602 where an ongoing data session is active and the application running on the mobile device is exchanging data with a base station. At 604 the application running in collaboration with the claimed subject matter, and in particular in conjunction with the facilities and functionalities provided by execution engine 306, determines that there is no further data that needs to be intercommunicated with the base station. In recognition that data interchange between the application executing on the mobile device and the remote base station has come to an end, the hysteresis activation timer (HAT) status can be solicited at 606 and a suitable response received at 608. At 610 based at least in part on the response received at 608 (e.g., whether or not the hysteresis activation timer (HAT) is running) a determination can be made regarding an appropriate value with which to set, re-set, or update the hysteresis activation timer. At 612 a new desired value of the hysteresis activation timer (HAT) can be set and thereafter at 614 the hysteresis activation timer value can be updated on the hysteresis activation timer (HAT) and the hysteresis activation timer (HAT) restarted. It should be noted without limitation or loss of generality, that at 612 a determination can be made as to whether or not the hysteresis activation timer (HAT) value even needs to be changed. Where it is ascertained that the value under which the hysteresis activation timer is currently operating is preferable to the newly determined value (e.g., ascertained at act 610) no action need be taken to set or update the value of the hysteresis activation timer (HAT) and consequently the hysteresis activation timer (HAT) need not be restarted.

It will be appreciated that, in accordance with one or more aspects described herein, inferences can be made regarding intelligently setting a hysteresis activation timer so that hysteresis can be entered sooner in order to conserve the battery life of an associated mobile device or access terminal. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
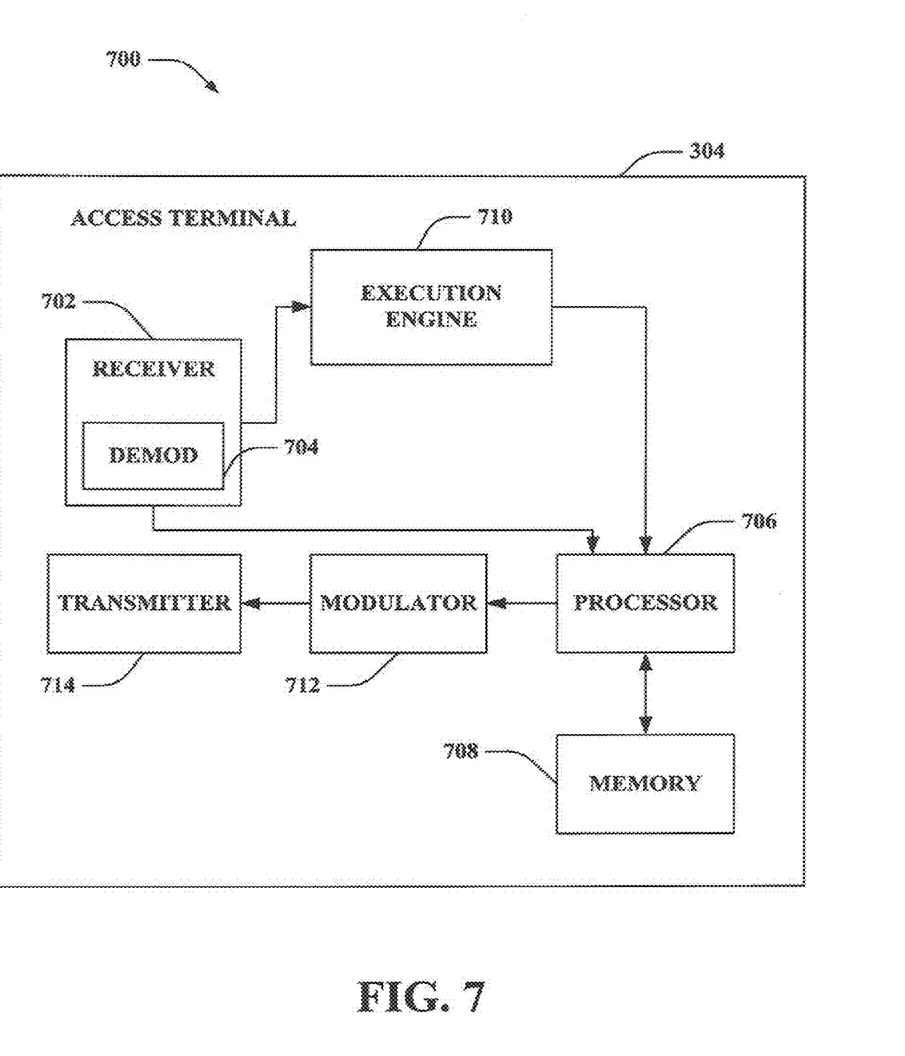
FIG. 7 is an illustration of an example access terminal that intelligently sets a hysteresis activation timer so that hysteresis can be entered sooner in order to conserve the battery life of the associated mobile device or access terminal.

FIG. 7 is an illustration 700 of an access terminal 304 that facilitates intelligently setting a hysteresis activation timer so that hysteresis can be entered sooner in order to conserve the battery life of the access terminal 304. Access terminal 304 comprises a receiver 702 that receives a signal from, for instance, a receive antenna (not shown), and performs typical actions thereon (e.g., filters, amplifies, downconverts, etc.) the received signal and digitizes the conditioned signal to obtain samples. Receiver 702 can be, for example, an MMSE receiver, and can comprise a demodulator 704 that can demodulate received symbols and provide them to a processor 706 for channel estimation. Processor 706 can be a processor dedicated to analyzing information received by receiver 702 and/or generating information for transmission by a transmitter 714, a processor that controls one or more components of access terminal 304, and/or a processor that both analyzes information received by receiver 702, generates information for transmission by transmitter 714, and controls one or more components of access terminal 304.

Access terminal 304 can additionally comprise memory 708 that is operatively coupled to processor 706 and that can store data to be transmitted, received data, and any other suitable information related to performing the various actions and functions set forth herein. For instance, memory 708 can store group-specific signaling constraints employed by one or more base stations. Memory 708 can additionally store protocols and/or algorithms associated with identifying signaling constraints used for communicating resource block assignments and/or employing such signaling constraints to analyze received assignment messages.

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Receiver 702 is further operatively coupled to a execution engine 710 which can be substantially similar to execution engine 306 of FIG. 3. Access terminal 304 still further comprises a modulator 712 and a transmitter 714 that transmits the signal to, for instance, a base station, another access terminal, etc. Although depicted as being separate from the processor 706, it is to be appreciated that execution engine 710 and/or modulator 712 can be part of processor 706 or a number of processors (not shown).

Figure 8:
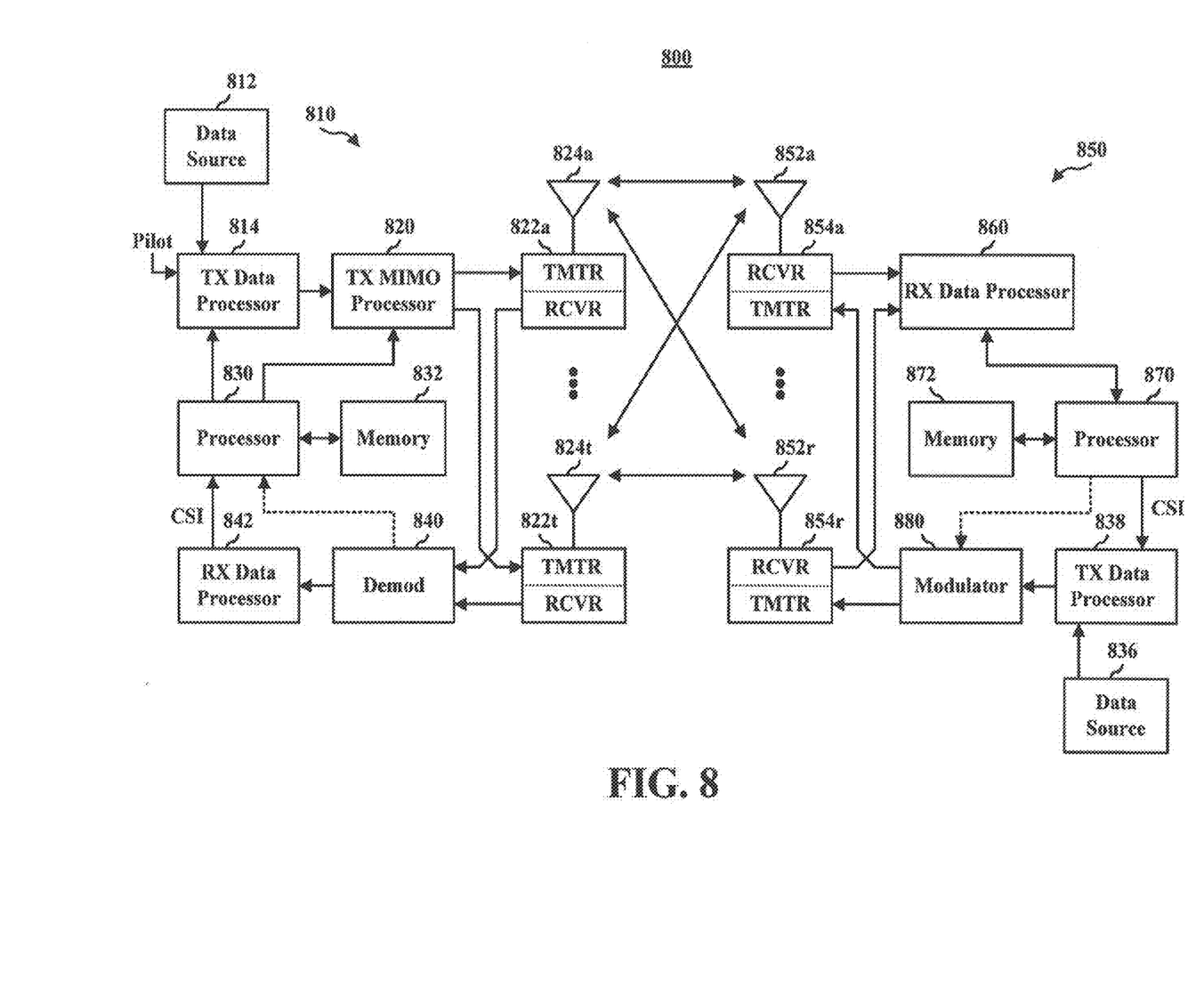
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-4, 7, and 9) and/or methods (FIGS. 5-6) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which preceding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
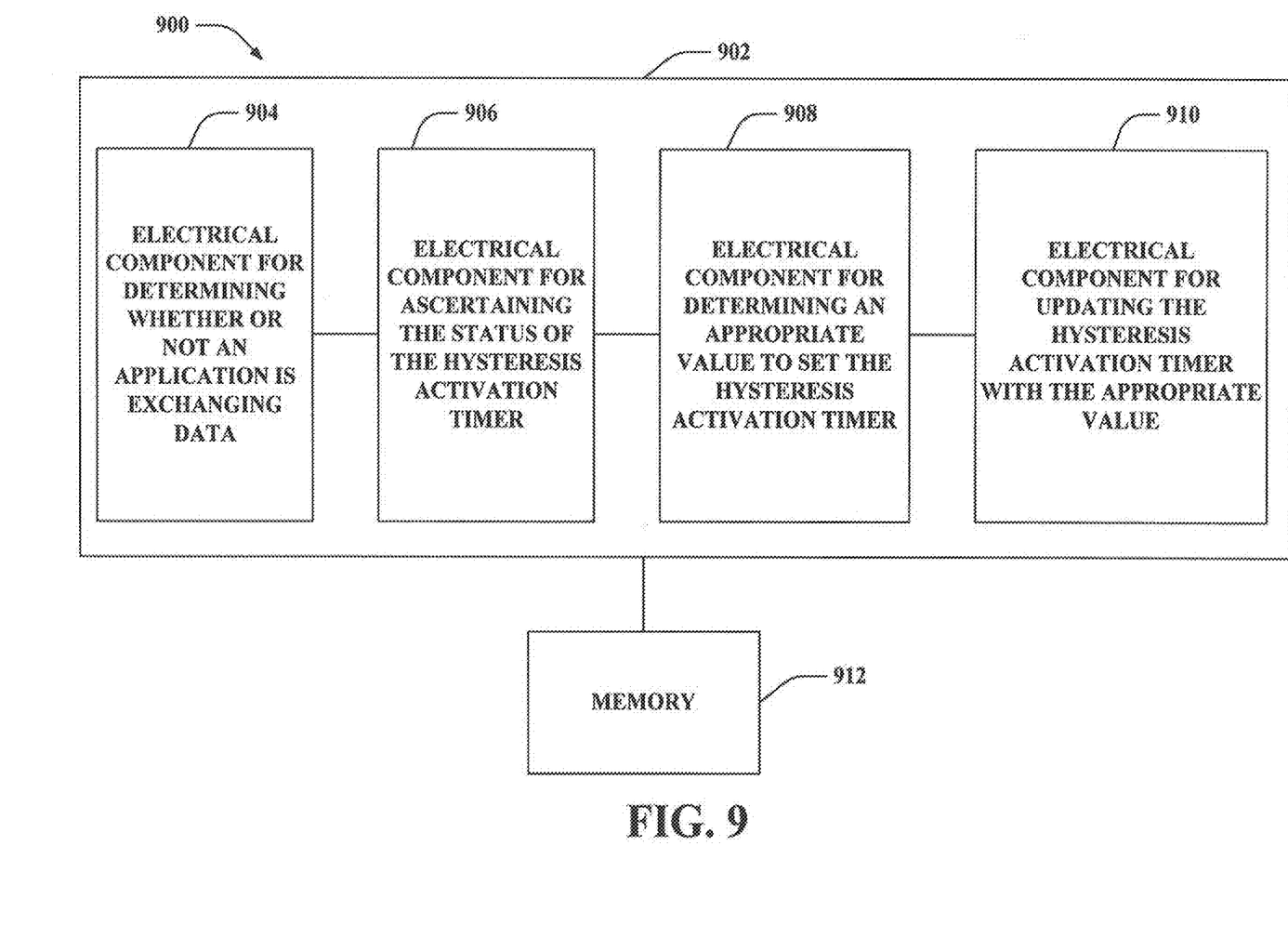
FIG. 9 is an illustration of an example system that that intelligently sets a hysteresis activation timer so that hysteresis can be entered sooner in order to conserve the battery life of an associated mobile device or access terminal.

Turning to FIG. 9, illustrated is a system 900 that intelligently sets a hysteresis activation timer so that hysteresis can be entered sooner in order to conserve the battery life of an associated mobile device or access terminal in a wireless communication environment. System 900 can reside within an access terminal, for instance. As depicted, system 900 includes functional blocks that can represent functions implemented by a processor, software, or combination thereof (e.g., firmware). System 900 includes a logical grouping 902 of electrical components that can act in conjunction. Logical grouping 902 can include an electrical component for determining whether or not an application is exchanging data 904. Further, logical grouping 902 can include an electrical component for ascertaining the status of an hysteresis activation timer 906. Moreover, logical grouping 902 can include an electrical component for determining an appropriate value to set the hysteresis activation timer 908. Moreover, logical grouping 902 can include an electrical component for updating the hysteresis activation timer with the appropriate value 910. Additionally, system 900 can include a memory 912 that retains instructions for executing functions associated with electrical components 904, 906, 908, and 910. While shown as being external to memory 912, it is to be understood that electrical components 904, 906, 908, and 910 can exist within memory 912.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for intelligently setting a hysteresis activation timer in a wireless communication environment, comprising:
   monitoring a data session to determine a quantity of data that remains to be sent by an application;
   acquiring an indication from the hysteresis activation timer of a current hysteresis activation timer value;
   determining a new hysteresis activation timer value based at least in part on the quantity of data that remains to be sent and the current hysteresis activation timer value; and
   updating the hysteresis activation timer with the new hysteresis activation timer value.

2. The method of claim 1, wherein the updating further comprises restarting the hysteresis activation timer subsequent to replacing the current hysteresis activation timer value with the new hysteresis activation timer value.

3. The method of claim 1, wherein the determining further comprises obtaining the current hysteresis activation timer value from the hysteresis activation timer.

4. The method of claim 3, wherein the new hysteresis activation timer value is based at least in part on the current hysteresis activation timer value.

5. The method of claim 1, wherein the determining further comprises comparing the new hysteresis activation timer value with the current hysteresis activation timer value and deciding to maintain the current hysteresis activation timer value.

6. The method of claim 1, further comprising, based at least in part on the acquiring and where the indication reveals that the hysteresis activation timer is inactive, starting the hysteresis activation timer with the new hysteresis activation timer value.

7. A wireless communications apparatus, comprising:
a memory configured to retain instructions related to monitoring a data session to determine a quantity of data that remains to be sent by an application, acquiring an indication from a hysteresis activation timer of a current hysteresis activation timer value, determining a new hysteresis activation timer value based at least in part on the quantity of data that remains to be sent and the current hysteresis activation timer value, and updating the hysteresis activation timer with the new hysteresis activation timer value; and
a processor coupled to the memory and configured to execute the instructions retained in the memory.

8. The wireless communications apparatus of claim 7, wherein the updating further comprises restarting the hysteresis activation timer subsequent to replacing the current hysteresis activation timer value with the new hysteresis activation timer value.

9. The wireless communications apparatus of claim 7, wherein the determining further comprises obtaining the current hysteresis activation timer value from the hysteresis activation timer and utilizing the current hysteresis activation timer value to ascertain the new hysteresis activation timer value.

10. The wireless communications apparatus of claim 7, wherein the determining further comprises comparing the new hysteresis activation timer value with the current hysteresis activation timer value and deciding to maintain the current hysteresis activation timer value.

11. The wireless communications apparatus of claim 7, further including, based at least in part on the acquiring revealing that the hysteresis activation timer is inactive, starting the hysteresis activation timer with the new hysteresis activation timer value.

12. A wireless communications apparatus configured to intelligently set a hysteresis activation timer in a wireless communication environment, comprising:
means for determining a quantity of data that remains to be sent by an application;
means for acquiring an indication from the hysteresis activation timer of a current hysteresis activation timer value;
means for ascertaining a new hysteresis activation timer value based at least in part on the quantity of data that remains to be sent and the current hysteresis activation timer value; and
means for updating the hysteresis activation timer with the new hysteresis activation timer value.

13. The wireless communications apparatus of claim 12, wherein the means for updating is configured to restart the hysteresis activation timer subsequent to replacing the current hysteresis activation timer value with the new hysteresis activation timer value.

14. The wireless communications apparatus of claim 12, wherein the means for ascertaining is configured to obtain the current hysteresis activation timer value from the hysteresis activation timer prior to ascertaining the new hysteresis activation timer value.

15. The wireless communications apparatus of claim 12, wherein on expiration of the new hysteresis activation timer value activated on the hysteresis activation timer, the means for receiving enters a state of hysteresis.

16. A computer program product, comprising:
a non-transient computer-readable medium comprising:
code for monitoring a data session to determine a quantity of data that remains to be sent by;
code for acquiring an indication from an hysteresis activation timer of a current hysteresis activation timer value;
code for determining a new hysteresis activation timer value based at least in part on the quantity of data that remains to be sent and the current hysteresis activation timer value; and
code for setting the hysteresis activation timer with the new hysteresis activation timer value.

17. The computer program product of claim 16, wherein the computer-readable medium further comprises code for restarting the hysteresis activation timer subsequent to replacing the current hysteresis activation timer value with the new hysteresis activation timer value.

18. The computer program product of claim 16, wherein the computer-readable medium further comprises code for obtaining the current hysteresis activation timer value from the hysteresis activation timer.

19. The computer program product of claim 16, wherein the computer-readable medium further comprises code for comparing the new hysteresis activation timer value with the current hysteresis activation timer value and deciding to maintain the current hysteresis activation timer value.

20. A wireless communications apparatus, comprising:
a processor configured to:
continuously monitor a data session to determine a quantity of data that remains to be sent by an application;
obtain an indication from an hysteresis activation timer of a current hysteresis activation timer value;
ascertain a new hysteresis activation timer value based at least in part on the quantity of data that remains to be sent and the current hysteresis activation timer value; and
reset the hysteresis activation timer with the new hysteresis activation timer value.

21. The wireless communications apparatus of claim 20, wherein the processor is further configured to compare the new hysteresis activation timer value with the current hysteresis activation timer value and decide to maintain the current hysteresis activation timer value.

* * * * *